United States Patent [19]

Win et al.

[11] Patent Number: 4,730,190

[45] Date of Patent: Mar. 8, 1988

[54] HAND-HELD MEASURING DEVICE

[75] Inventors: Leslie A. Win, San Francisco, Calif.; Wai Chi Wilkie Lam, Causeway Bay, Hong Kong

[73] Assignee: Winlam Company, San Francisco, Calif.

[21] Appl. No.: 924,390

[22] Filed: Oct. 29, 1986

[51] Int. Cl.$^4$ .............................................. G01S 13/08
[52] U.S. Cl. ........................................ 342/118; 356/5; 356/379; 367/910
[58] Field of Search ............... 342/118; 356/4, 5, 379; 364/564; 367/910

[56] References Cited

U.S. PATENT DOCUMENTS

| | | | |
|---|---|---|---|
| 3,513,444 | 5/1970 | Henderson et al. | 356/379 X |
| 3,588,480 | 6/1971 | Unger et al. | 364/564 |
| 4,281,404 | 7/1981 | Morrow, Jr. et al. | 367/910 X |
| 4,494,224 | 1/1985 | Morrell et al. | 367/910 X |
| 4,584,676 | 4/1986 | Newman | 367/910 X |

Primary Examiner—T. H. Tubbesing
Attorney, Agent, or Firm—Townsend and Townsend

[57] ABSTRACT

A hand-held, portable, simple to use, low-cost yet accurate measurement device for measuring distances and calculating areas and volumes. The device comprises a microprocessor-controlled transmitter/receiver combination for transmitting measuring signals, and receiving reflections of those signals to provide distance or length measurements. The microprocessor operates to store sequential measurements and to calculate areas and volumes therefrom. The measurement procedure involves aiming the device and operating a simple sequence of buttons to obtain the measurements. Additional features of the device include a target and stand to reflect the measuring signals, a viewfinder, a level meter, and an indented rear portion with flush sides to place the device against a vertical surface for measuring, and a generally flat surface to place the device on a horizontal surface for measuring.

9 Claims, 8 Drawing Figures

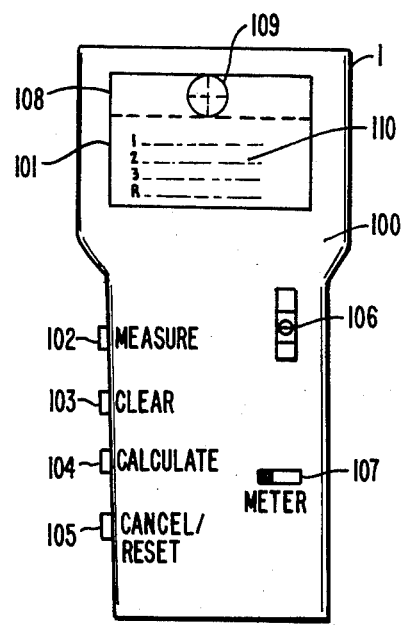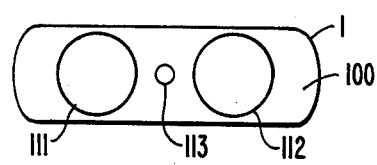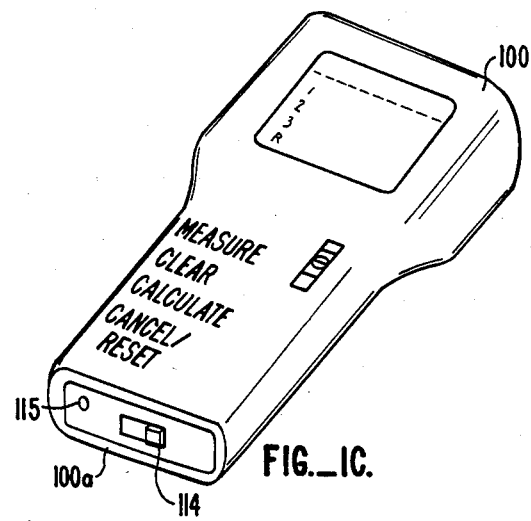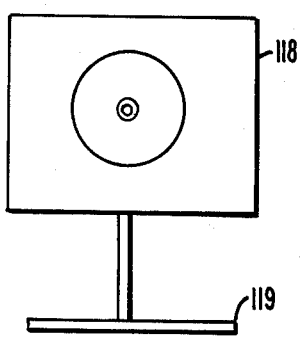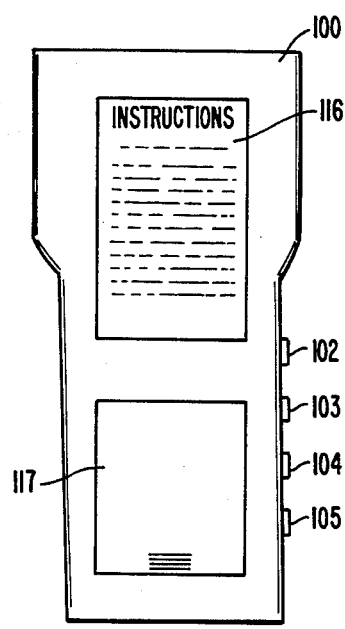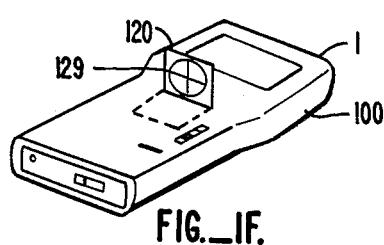

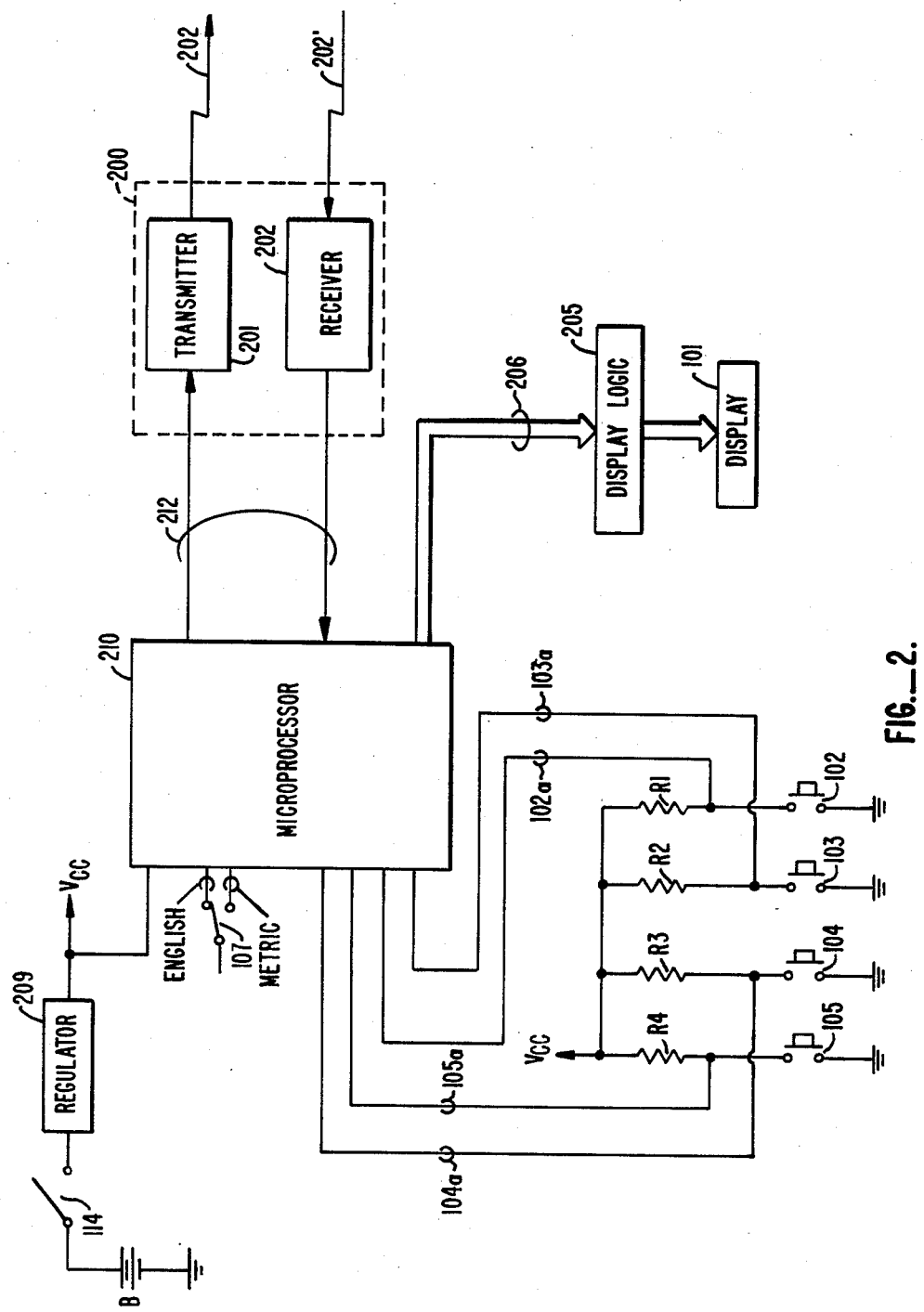
FIG._2.

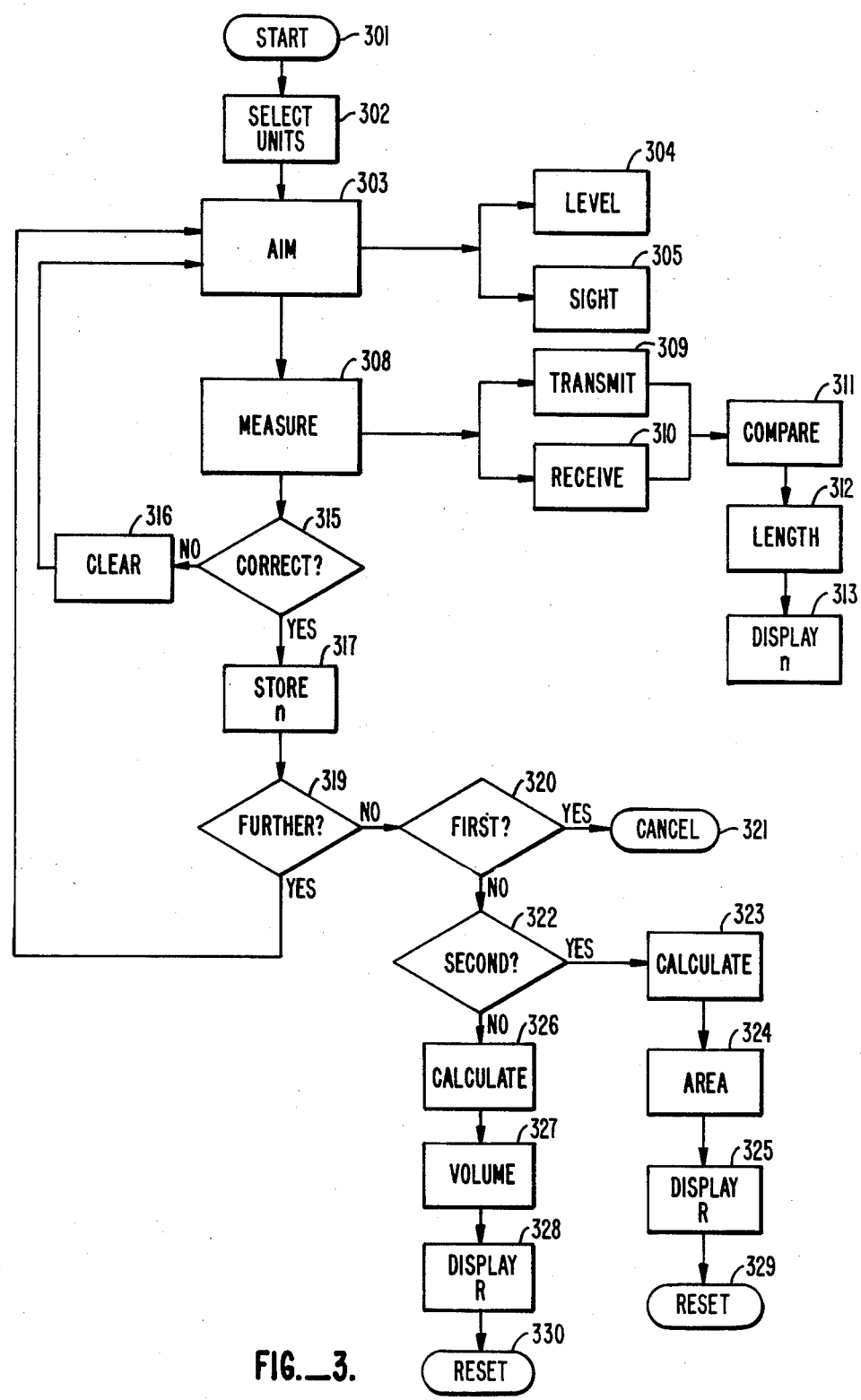
FIG._3.

HAND-HELD MEASURING DEVICE

FIELD OF THE INVENTION

The present invention relates to non-contact, distance measuring devices, and more particularly to portable devices for non-contact distance and length measurements and calculations of area and volume therefrom in an operationally simple manner.

BACKGROUND OF THE INVENTION

Historically when man in his vocation or avocation has endeavored to determine the size of an object with greater precision than that gained from "eye-balling", he has generally had two choices: He can use a mechanical means such as the well-known rule or tape measure or he can use an electronic apparatus employing electromagnetic or ultrasonic waves.

Mechanical means such as rules and tape measures are portable and simple to use, but suffer severe limitations as to accuracy and range of measurement. Everyone is familiar with the difficulty of obtaining an accurate distance or length measurement using a tape measure: The opposite end of the tape must be held by someone else, it must be in a straight line, it must be exactly horizontal or vertical, there must be no kinks in the tape, and so on. Generally, for measurements greater than a yard, it is a two-man operation with its attendant communication problems, and the results are usually not very accurate nor quickly obtained. Furthermore, there is always the danger of damaging the object being measured by contact with the measuring device.

Electronic measuring devices, on the other hand, have provided greater accuracy and avoided damage to the object measured. These advantages, however, have generally been achieved at costs of operational complexity, cumbersomeness, and high price.

The concept of using electromagnetic and sound waves to measure distance is well-known in the art. Various generally highly accurate methods have been devised, among which are phase comparisons of the transmitted and reflected waves (Hildebrand, U.S. Pat. No. 2,956,472), double image overlap (Honeywell system, U.S. Pat. No. 3,274,914), ultrasound time-lag (Japanese Patent Publication No. 47-048,408), and intensity comparison (Takahashi. U.S. Pat. No. 4,518,253). Much of the prior art has been directed to specific uses. For example. Dewar's U.S. Pat. No. 4,541,721 is an apparatus for checking the gap between hood and fender in automobile manufacture. the Honeywell and Takahashi systems are for cameras, and Niss' U.S. Pat. No. 3,765,764 is a coordinate measuring instrument for scientific and engineering uses.

Thus, the prior art in electronic measuring devices has emphasized extreme accuracy and specialized uses. Generally the devices are complicated, requiring specialized skill and procedures. No one has considered using these highly accurate methods in a convenient, low-cost device to provide the measurement needs of business and home.

SUMMARY OF THE INVENTION

Disclosed is a portable, operationally simple, low-cost yet accurate measurement device for everyday business or home use.

Broadly, the present invention comprises a microprocessor-controlled transmitter/receiver combination for transmitting energy of some form (e.g., electromagnetic or ultrasonic signals) and for receiving reflections of that transmitted energy to provide a distance or length measurement. The present invention is housed in an enclosure of hand-held size with a handle suitable for easy gripping. Control buttons are arrayed on the housing for convenient operation using only one hand. A display window is provided to display measurement and calculated information to the user.

In a preferred embodiment of the invention, a controlling microprocessor is connected to receive command information from four finger-depressable buttons (MEASURE, CLEAR. CALCULATE and CANCEL/RESET) and to respond to such command information to operate the transmitter/receiver combination to obtain distance measurements from the transmitted and received (reflected) signals. The microprocessor operates to store sequential measurements so that one can obtain, for example, an area measurement from the last two distance measurements, or a volume measurement from the last three distance measurements.

In an alternate embodiment of the invention, a built-in viewfinder is provided to allow one to verify that the desired dimension is being measured.

In another embodiment of the invention, the rear portion of the device is constructed so as to enable the device to be placed flush against, for instance, a wall thereby making the device perpendicular to that wall, making possible a precise measurement of the distance from that wall to another wall.

A further feature of the device is a leveling meter to ensure that the device is exactly horizontal for accurate measurements.

In operation, the device of the present invention is oriented along the dimension to be measured and the button "MEASURE" depressed, causing activation of the transmitter/receiver combination to make a distance measurement. The measurement is displayed for reference, and to verify that the desired dimension was in fact measured. The value is then stored by the microprocessor. In order to measure area, the device is oriented along the appropriate second dimension of the object to be measured, the "MEASURE" button is again depressed, the value measured displayed and stored in the microprocessor. At this point, if the button marked "CALCULATE" is depressed, the microprocessor multiplies the two previously stored measurement values to produce an area calculation that is displayed to the user. If a volume is desired, the device is oriented along the third dimension, the "MEASURE" button is once more depressed, the measured value is displayed and stored in the microprocessor. If at this point the "CALCULATE" button is depressed. the volume is calculated by multiplying the three stored measured values and displayed.

For more accurate measurements, and to facilitate the measurements of certain objects with no ready target plane for reflecting the signals, a reflector with clips, stands, and suction cups is provided to attach to the object to be measured.

To provide measurements of other-shaped objects, the microprocessor may be programmed to calculate the areas and volumes of circles, cylinders, spheres, or other oddly-shaped objects for specialized measurements.

The present invention is thus useful for, among other things, such enterprises as moving, design, architecture, interior design, and businesses with packing or specialized measurements needs, and the like. It is also useful for home measurements of all kinds.

For a further understanding of the nature and advantages of the present invention, reference should be made to the remaining portions of this application and the attached drawings.

BRIEF DESCRIPTION OF THE DRAWINGS

FIG. 1A is a top view of the invention, showing the configuration of the housing for hand-held operation;

FIG. 1B is a front view of the invention of FIG. 1A;

FIG. 1C is a perspective view of the invention shown in FIG 1A illustrating the general shape;

FIG. 1D is a bottom view of the invention to illustrate an instruction plate and battery compartment door;

FIG. 1E illustrates a reflector and stand for use with the present invention;

FIG. 1F is another perspective view of the invention, illustrating an alternate embodiment with a foldable viewfinder;

FIG. 2 is a block diagram of the general electronic design of the present invention; and FIG. 3 is a flowchart, describing the operational process of the present invention.

DETAILED DESCRIPTION OF THE INVENTION

Referring to FIG. 1A, which is a top view of the present invention, the hand-held measuring device, generally designated with the reference numeral 1, is shown as including housing 100 configured for hand-held use. Formed in the housing 100 is a display window 101, and mounted on an accessible surface is a MEASURE button 102, a CLEAR button 103, a CALCULATE button 104, a CANCEL/RESET button 105, a level meter 106, and a meters/feet units switch 107.

Display window 101 has at its top a viewfinder screen 108 with cross-hairs 109 and digital display read-out positions for three measured values labeled on the window as "1", "2", and "3" and a calculated result position labeled "R".

FIG. 1B is a front view of DEVICE 1 showing the front of housing 100, apertured at 111, for allowing egress of transmitted energy, and at 112 for receiving reflections of the transmitted energy, and viewfinder lens 113. FIG. 1C is a perspective view of DEVICE 1, showing the generally flat top surface with smoothly curved corners of the housing 100, and a generally flat bottom surface for laying on another generally flat surface to make a measurement. At the back of housing 100 can be seen an ON/OFF switch 114 and a battery indicator light 115. The back of housing 100 is indented at the center with the edges at the back being raised so that ON/OFF switch 114 and battery indicator light 115 do not protrude beyond the back edges of housing 100.

FIG. 1D is a bottom view of DEVICE 1 showing the operation instructions plate 116 attached to the bottom of housing 100 and battery compartment door 117. Regular, rechargeable, or solar cells may be used as the power source for the electronics (FIG. 2) within the housing 100. If solar cells are used, an appropriate window for receiving solar light is included on the top of housing 100. The buttons MEASURE 102, CLEAR 103, CANCEL 104, and CALCULATE 105 can also be seen.

FIG. 1E shows a reflector 118 with a bull's eye and reference circle and reflector stand 119. Reflector 118 can also be equipped with various other attachment devices such as suction cups or clips depending on the object to which reflector 118 is to be attached.

FIG. 1F shows an alternate embodiment of the present invention with foldable viewfinder 120. An operator may peer through foldable viewfinder 120 to verify that he is aiming at the correct part of the object to be measured or, if reflector 118 (FIG. 1E) is being employed, whether DEVICE 1 is properly aimed at it. Ease of aiming is provided by cross-hairs 129. The dotted lines show the foldable viewfinder 120 in the folded position.

Housing 100 is sized to fit in one hand with the fingers of the hand wrapped around housing 100 such that they can operate buttons 102–105 conveniently with the one hand. Level meter 106 is a simple bubble level with reference line used to ensure that DEVICE 1 is perfectly horizontal when a measurement requiring horizontality is made. Units switch 107 is a conversion switch for making measurements in units of meters or feet or other units which may be suitable at hand. Viewfinder screen 108 or foldable viewfinder 120 allows the user of DEVICE 1 to easily line up DEVICE 1 with the target thereby ensuring that the proper dimension is being measured. If reflector 118 is employed, then the cross-hairs 109 in viewfinder 108 or the crosshairs 129 in foldable viewfinder 129 can be easily lined up with the bull's eye on reflector 118.

FIG. 2 is a schematic diagram showing the general electronic design of DEVICE 1. The on/off switch 114 is coupled to a direct voltage source B such as a dry cell battery, rechargeable battery, or solar cell. On/off switch 114 is connected to a microprocessor 210 through regulator 209 which regulates the voltage from the voltage source to provide a supply voltage $V_{cc}$ to microprocessor 210 and other elements of the system. Units of measure, such as meters or feet, are selectable by SWITCH 107 which is operatively connected to microprocessor 210. Microprocessor 210 includes read-only and random-access memories, control capability to control the operations of DEVICE 1, and calculation capability for calculating areas and volumes from measured distance and length values.

Microprocessor 210 is connected to a transmitter/receiver section 200 by a control bus 212. As illustrated in FIG. 2, the transmitter/receiver section 200 includes a transmitter section 201 and a receiver section 203. Energy transmission 202 by the transmitter 201 is initiated by the microprocessor 210 when control signals are communicated thereto on the control bus 212. Similarly, receipt of reflected energy 202' by the receiver 203 is indicated to the microprocessor 10 by signals communicated thereto on the control bus 212.

The transmitter and receiver sections 201, 203 of the transmitter/receiver combination 200 can take a variety of forms well known in the art, depending upon whether the transmitted energy 202 is electromagnetic, electro-optical, sonic, ultrasonic, or some other form.

Examples of disclosures of signal transmission, signal reception, and signal processing for distance measurements are U.S. Pat. Nos. 2,956,472, 3,274,914, 4,518,253, and Japanese Pat. Pub. No. 47-048,408 the disclosures of which are hereby incorporated by reference.

To control operation of the transmitter/receiver combination 200, and to manipulate the measured values obtained and subsequently stored in the microprocessor 210, there are provided the four fingerdepressable buttons 102–105, respectively designated: MEASURE, CLEAR, CALCULATE, and CANCEL/RESET (FIG. 1). These are spring-loaded buttons which, when depressed, complete a circuit between the supply voltage $V_{cc}$ (through an associated one of the resistors R1–R4) and ground to generate a command signal that is communicated to microprocessor 210, via one of the signal lines 102a–105a, to activate the measurement or calculation process, as the case may be, which processes are explained following.

The measuring process is begun by depressing MEASURE button 102. The voltage load on microprocessor 210 causes microprocessor 210 to activate the transmitter/receiver combination 200 and to cause transmitter 201 to emit energy signal 202. Receiver 203 operates to receive the reflected energy signal 202' from the target at which DEVICE 1 is aimed, and an indication of such receipt is communicated to the microprocessor 210 via the central bus 212. The microprocessor can then determine a measure of the distance that the emitted signal 202/202' travelled to the target.

The microprocessor 210 then routes the distance value just determined to display logic 205, via a data bus 206, which determines where in display 101 the value just measured will be shown. This depends on which measurement in the sequence of measurements this particular value falls. Microprocessor 210 keeps track of the number of times MEASURE button 102 is depressed and will signal display logic 205 to cause the value to be displayed in the appropriate position on display 101. For instance, the first measurement (MEASURE button 102 depressed just once) is displayed in the first display position of display 101, the second measurement (MEASURE button 102 depressed a second time in this sequence of measurements) is displayed in the second display position of display 101 and so on. This distance/length value is also stored in microprocessor 210 in the memory register, again corresponding to which measurement was made in the given sequence.

As each measurement value is obtained, it is stored by the microprocessor 210 in a storage element (not shown) such as a register stack, or the like. For calculating areas and volumes, the values stored in the storage element (not shown) are sequentially accessed and used to calculate the desired measurement.

Depressing CALCULATE button 105 activates the calculation function of microprocessor 210. It will cause the values stored in microprocessor 210 to be combined in such a way as to produce the desired measurement. For instance, in one embodiment of the present invention, after making two measurements of a rectangular object, the two length values stored in microprocessor 210 will be multiplied to give the area of the measured rectangle. If a third dimension is measured and stored, then it would also be multiplied to give the volume of the solid rectangular object. In another embodiment of the present invention, if the object to be measured is circular, then after a proper measurement of the diameter of the circle, depressing the CALCULATE button 105 will result in microprocessor 210 halving that diameter, squaring the result and multiplying by $\pi$ to give the area of the circle. This value can be stored in microprocessor 210 if the CANCEL button 104 is not depressed. Thus if a measure of the volume of a cylinder is desired, a measurement of the length of the cylinder using MEASURE button 102 and subsequent depression of CALCULATE button 105 will result in multiplying the area by the length giving cylinder volume. Similarly, the volume of a sphere may be calculated from one measurement of diameter, halving it, cubing it, and multiplying by $(4/3)\pi$. In this manner, areas and volumes of oddly-shaped objects could be calculated by microprocessor 210.

Depressing CANCEL/RESET button 104 causes all the values displayed on display 101 and all the values stored in microprocessor 210 to be erased and re-sets microprocessor 210 for the next measurement or calculation.

Depressing CLEAR button 103 clears display 101 of the last value and erases the last value stored in microprocessor 210, but does not clear any other value displayed on display 101 nor erase any other measurements held in microprocessor 210 storage.

Placing ON/OFF switch 106 to OFF resets DEVICE 1, clearing display 101 and causing all measurements stored in microprocessor 210 to be erased. Placing ON/OFF switch at ON turns on the power for DEVICE 1.

FIG. 3 is a flowchart showing the operation of DEVICE 1 for the measurement of a rectangular object. DEVICE 1 is turned on at 301, the user then selects the units 302 to be used in the measurement and aims the device 303. Aiming may include leveling the device 304 and sighting 305 either a target on the object or the reflector. After aiming, the user measures distances 308 by activating the signal transmitter at 309 and the signal receiver at 310. The emitted and reflected signals are compared at 311 to determine the distance value at 312, which value is then displayed at 313 in display position n (where n=1, 2, or 3 depending on which measurement is made). If the displayed value does not seem correct due to perhaps aiming at the wrong target, or the user decides to take the measurement in a different manner, then the user clears the display at 316, which also clears the memory of this latest value, and the process is repeated from the aim step 303. If the displayed value reflects the desired measurement, the value is stored at 317 in memory register n. If there are further measurements 319 to be made in this task such as measuring another dimension, then the process is repeated from the aim step 303. If there are no further measurements to be made for this task, and if there was only a first measurement 320, the user will note the displayed value and cancel/reset at 321 which clears the display and erases the microprocessor memory. If the last measurement made for the given task was the second measurement made at 322, and the user desires an area calculation, the calculation function is activated 323, the area calculated 324, and the area value displayed in the R position of the digital display (see FIG. 1A) at 325. The desired measurement process is now completed and the user resets at 329 which clears the display and erases the microprocessor memory of the values in this particular sequence. If the last measurement made in the given task was not the second measurement (and since it was also not the first measurement, it must have been the third measurement), then the calculate function 326 causes the volume 327 to be calculated by multiplying the three stored dimension values and the value is displayed in the display R position (see FIG. 1A) at 328. The user then resets for the next series of measurements at 330.

Returning to FIG. 1A, in operation, a user takes DEVICE 1 in hand and positions it with its back end at the edge of an object to be measured. The user then aims DEVICE 1 at a target appropriate for the measurement and presses the MEASURE button 102. In the manner stated above, the measured value is displayed and either cleared or stored. The measurement is made with the back end of DEVICE 1 aligned with the near extremity of the object to be measured. The length of DEVICE 1 will be included in the measurement. In this way DEVICE 1 may be placed with its back end flush against, for instance, an inside wall to measure the inside dimensions of a room.

If there is no convenient target available at which to aim DEVICE 1, the user can set up reflector 118 (see FIG. 1E) at the position appropriate for the measurement and make the measurement from DEVICE 1 to reflector 118.

After the desired measurements have been made, areas and volumes may be calculated using the CALCULATE button 105.

In summary, it can be seen that the present invention provides a simple-to-use, accurate means for measuring distances, lengths, areas, and volumes of many different objects and places. The above description and illustrations should not be construed as limiting the scope of the invention which is defined by the appended claims.

I claim:

1. A portable, hand-held measurement device, comprising:
   transmitter means to transmit a signal at a target object;
   receiver means to receive a reflection of the signal reflected from the target object;
   processor means operably coupled to the transmitter and receiver means to obtain a measurement value, the processor means having storage means for storing pluralities of the measurement values and calculation means for calculating areas and volumes from the stored pluralities of measurements;
   display means coupled to the processor means for selectively displaying the measurement values and calculated areas and volumes; and
   viewfinder means for aiming the device at a target, the viewfinder means being disposed so as to project the target image onto the display means.

2. The device of claim 1 wherein the viewfinder means is foldable into the enclosure of the device.

3. The device of claim 1, further comprising leveling means for assessment of horizontality.

4. A portable, hand-held measurement device, comprising:
   transmitter means to transmit a signal at a target object;
   receiver means to receive a reflection of the signal reflected from the target object;
   processor means operably coupled to the transmitter and receiver means to obtain a measurement value, the processor means having storage means for storing pluralities of the measurement values and claculation means for calculating areas and volumes from the stored pluralities of measurements;
   display means coupled to the processor means for selectively displaying the measurement values and calculated areas and volumes; and
   switching means converting the measurements to a plurality of different measuring units.

5. The device of claim 4, including viewfinder means for aiming the device at a target.

6. The device of claim 5, wherein the device is housed in an enclosure sized and configured to be held in the hand of a person, and wherein the viewfinder means is foldable into the enclosure of the device.

7. A portable, hand-held measurement device, comprising:
   transmitter means to transmit a signal at a target object;
   receiver means to receive a reflection of the signal reflected from the target object;
   processor means operably coupled to the transmitter and receiver means to obtain a measurement value, the processor means having storage means for storing pluralities of the measurement values and calculation means for calculating areas and volumes from the stored pluralities of measurements;
   leveling means for assessment of horizontality;
   display means coupled to the processor means for selectively displaying the measurement values and calculated areas and volumes; and
   actuation means including a first button, depression of which operates to produce the measurement, and a second button, depression of which produces a calculation of areas from the measurements, said second button further operating to cause the processor means to produce a calculation of volumes from the measurements.

8. The device of claim 7 further comprising:
   portable reflecting means for reflecting the signal from the transmitter back to the receiver means.

9. The device of claim 8 further comprising:
   holding means for stably holding the portable reflecting means on an opbject, and stand means for stably supporting the portable reflecting means on a surface.

* * * * *